US012786946B2

(12) United States Patent
Huang et al.

(10) Patent No.: US 12,786,946 B2
(45) Date of Patent: Nov. 3, 2026

(54) TECHNIQUES FOR A POSITIONING REFERENCE SIGNAL MEASUREMENT WITH A MEASUREMENT GAP

(71) Applicant: Intel Products IP LLC, Santa Clara, CA (US)

(72) Inventors: Rui Huang, Santa Clara, CA (US); Andrey Chervyakov, Kildare (IE); Meng Zhang, Beijing (CN); Yi Guo, Shanghai (CN); Hua Li, Santa Clara, CA (US); Ilya Bolotin, Santa Clara, CA (US)

(73) Assignee: Intel Products IP LLC, Santa Clara, CA (US)

( * ) Notice: Subject to any disclaimer, the term of this patent is extended or adjusted under 35 U.S.C. 154(b) by 208 days.

(21) Appl. No.: 18/723,337

(22) PCT Filed: Feb. 16, 2023

(86) PCT No.: PCT/US2023/013194

§ 371 (c)(1),
(2) Date: Jun. 21, 2024

(87) PCT Pub. No.: WO2023/158726

PCT Pub. Date: Aug. 24, 2023

(65) Prior Publication Data

US 2025/0071724 A1 Feb. 27, 2025

Related U.S. Application Data

(60) Provisional application No. 63/311,409, filed on Feb. 17, 2022.

(51) Int. Cl.

| | |
|---|---|
| ***H04W 64/00*** | (2009.01) |
| ***H04L 5/00*** | (2006.01) |
| ***H04W 4/029*** | (2018.01) |

(52) U.S. Cl.
CPC ......... *H04W 64/003* (2013.01); *H04W 4/029* (2018.02)

(58) Field of Classification Search
CPC ... H04W 64/003; H04W 4/029; H04W 76/28; H04W 64/00; H04L 5/0094; H04L 5/0048
See application file for complete search history.

(56) References Cited

U.S. PATENT DOCUMENTS

2013/0059610 A1* 3/2013 Siomina ................ H04W 64/00 455/456.6
2021/0329618 A1 10/2021 Chervyakov et al.
(Continued)

FOREIGN PATENT DOCUMENTS

WO 2020/092336 A1 5/2020

OTHER PUBLICATIONS

"International Application Serial No. PCT US2023 013194, International Search Report mailed Jun. 19, 2023", 3 pgs.
(Continued)

*Primary Examiner* — Joseph E Dean, Jr.
(74) *Attorney, Agent, or Firm* — Schwegman Lundberg & Woessner, P.A.

(57) ABSTRACT

Various embodiments herein provide techniques for configuring and/or using a measurement gap (MG) for a positioning reference signal (PRS) measurement. For example, a user equipment (UE) may receive a configuration of a pre-configured measurement gap; identify that a measurement gap is needed for a positioning reference signal (PRS) measurement and that the CE has not previously notified a network of the PRS measurement prior to receipt of the
(Continued)

configuration; and encode, based on the identification, a location measurement indication for transmission to a network entity to indicate that the PRS measurement is to be performed. Other embodiments may be described and claimed.

20 Claims, 6 Drawing Sheets

(56) References Cited

U.S. PATENT DOCUMENTS

| | | | | |
|---|---|---|---|---|
| 2021/0337377 | A1 | 10/2021 | Manolakos et al. | |
| 2022/0046444 | A1* | 2/2022 | Manolakos | H04L 5/0091 |
| 2024/0187903 | A1* | 6/2024 | Hasegawa | G01S 5/0036 |
| 2024/0414683 | A1* | 12/2024 | Khoryaev | G01S 5/0036 |

OTHER PUBLICATIONS

"International Application Serial No. PCT US2023 013194, Written Opinion mailed Jun. 19, 2023", 5 pgs.

"International Application Serial No. PCT US2023 013194, International Preliminary Report on Patentability mailed Aug. 29, 2024", 7 pgs.

International Patent Office- International Search Report and Written Opinion mailed Jun. 19, 2023, from International Patent Application No. PCT/US2023/013194, 10 pages.

3GPP, Technical Specification Group Radio Access Network; NG Radio Access Network (NG-RAN); Stage 2 functional specification of User Equipment (UE) positioning in NG-RAN (Release 16), 3GPP TS 38.305 V16.7.0 (Dec. 2021), 5G, 117 pages.

3GPP, "Technical Specification Group Radio Access Network; NR; Radio Resource Control (RRC) protocol specification (Release 16)," 3GPP TS 38.331 V16.7.0 (Dec. 2021), 5G, 963 pages.

3GPP, "Technical Specification Group Radio Access Network; NR; Requirements for support of radio resource management (Release 17," 3GPP TS 38.133 V17.4.0 (Dec. 2021), 5G, 262 pages.

* cited by examiner

TECHNIQUES FOR A POSITIONING REFERENCE SIGNAL MEASUREMENT WITH A MEASUREMENT GAP

CROSS REFERENCE TO RELATED APPLICATIONS

The present application is a national phase entry under 35 U.S.C. § 371 of International Application No. PCT/US2023/013194, filed Feb. 16, 2023, entitled "TECHNIQUES FOR A POSITIONING REFERENCE SIGNAL MEASUREMENT WITH A MEASUREMENT GAP," which claims priority under 35 U.S.C. § 119(e) to U.S. Provisional Patent Application No. 63/311,409, which was filed Feb. 17, 2022, the entire disclosures of which are hereby incorporated by reference.

FIELD

Various embodiments generally may relate to the field of wireless communications. For example, some embodiments may relate to techniques for a positioning reference signal measurement with a measurement gap.

BACKGROUND

According to the 3rd Generation Partnership Project (3GPP) Technical Specification (TS) 38.331, V16.7.0, Section 5.5.6, if a user equipment (UE) is requested to perform positioning reference signal (PRS) measurements from a location management function (LMF), the UE can send a "LocationMeasurementIndication" information element (IE) to indicate to the network (serving next generation Node B (gNB)) to require a measurement gap (MG). However, the conditions under which the UE sends the IE are not well defined, and can lead to inefficient signaling.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein may relate to configuring and/or using a measurement gap (MG) for a positioning reference signal (PRS) measurement. For example, embodiments may define user equipment (UE) behavior when the network (NW) transforms a pre-configured MG to other MGs.

In some embodiments, a UE may receive a configuration of a pre-configured measurement gap. The UE may identify that the pre-configured measurement gap is needed for a PRS measurement and that the UE has not previously notified the network of the PRS measurement prior to receipt of the configuration. The UE may transmit, to the network based on the identification, a location measurement indication for transmission to a network entity to indicate that the PRS measurement is to be performed.

As discussed above, according to the 3GPP TS 38.331, V16.7.0 ("TS 38.331"), Section 5.5.6, if a UE is requested to perform positioning reference signal (PRS) measurements from a location management function (LMF), the UE can send a "LocationMeasurementIndication" information element (IE) to indicate to the network (serving next generation Node B (gNB)) to require a measurement gap (MG). However, which type of MG (e.g., a preconfigured MG (pre-MG) or legacy MG) will be configured for the UE is up to the NW.

Figure 1:
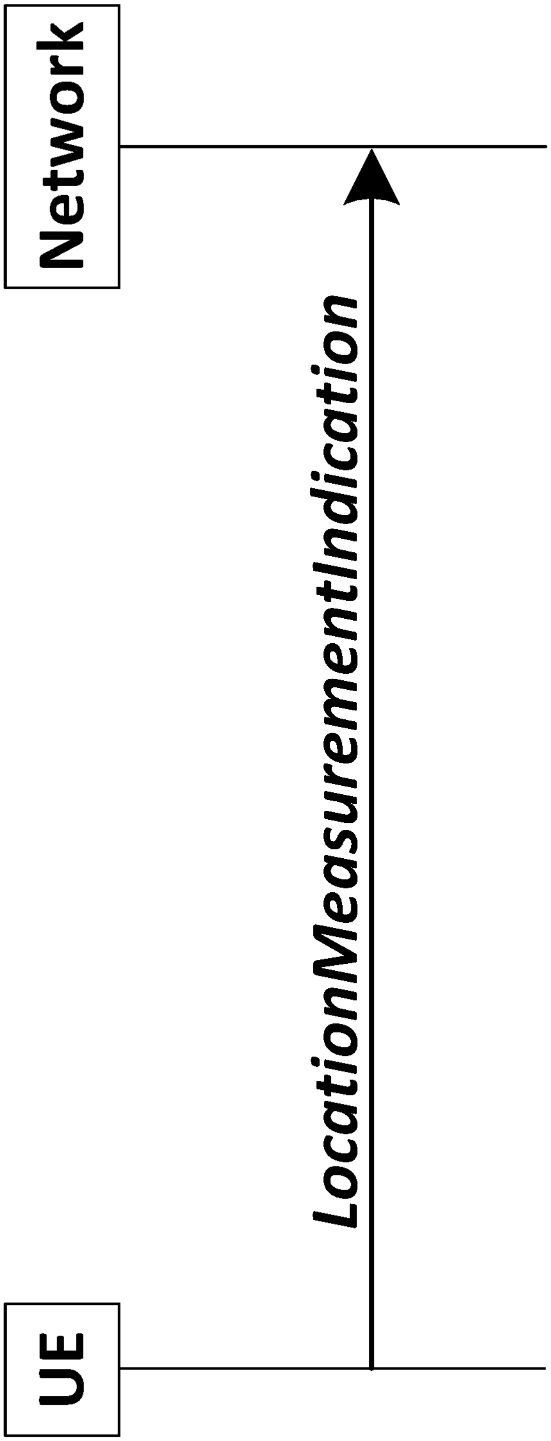
FIG. 1 illustrates an example of location measurement indication, in accordance with various embodiments.
Figure 5:
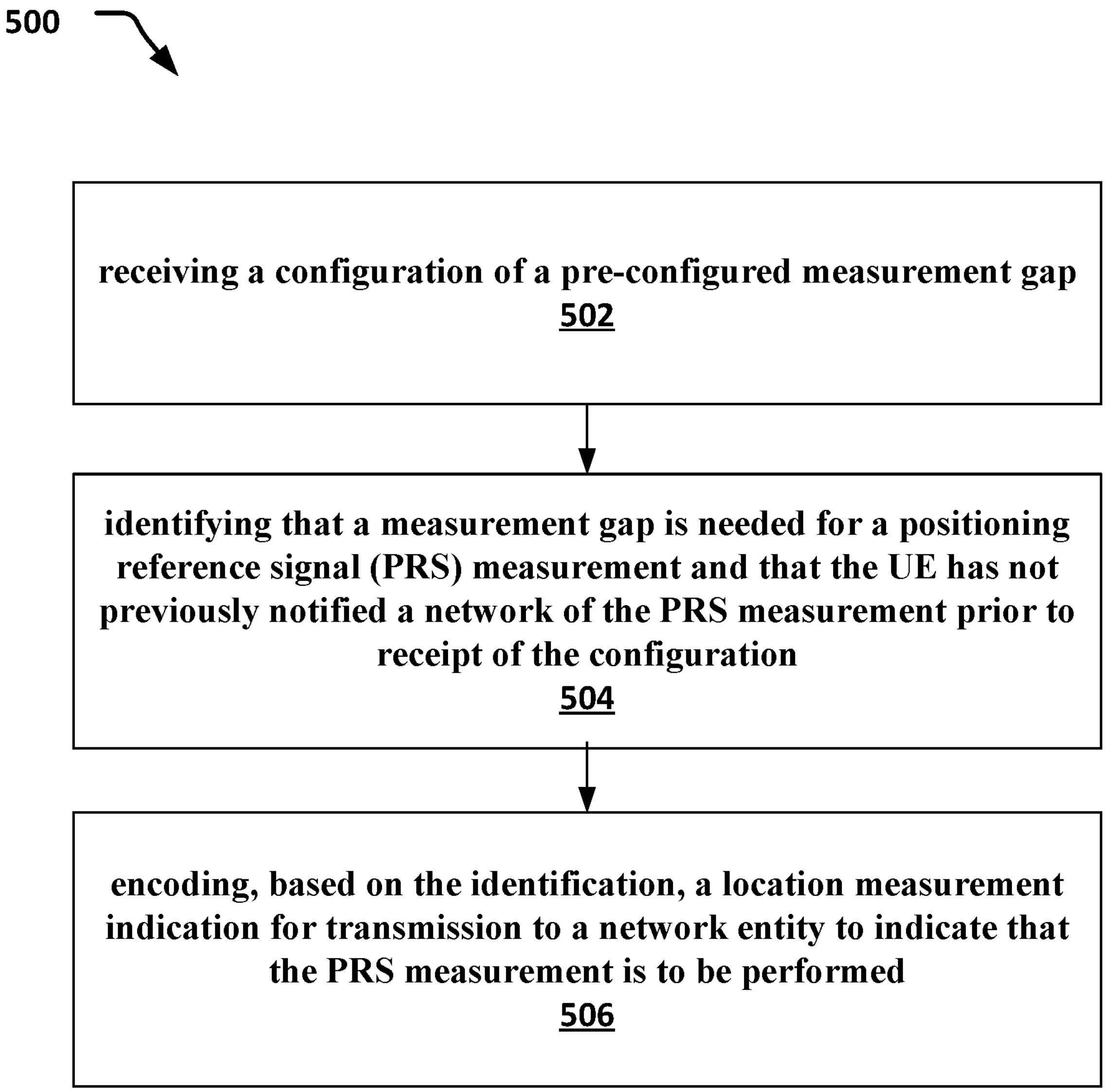
FIG. 5 illustrates an example process to practice the various embodiments herein.

FIG. 1 illustrates the location measurement indication IE, which corresponds to FIG. 5.5.5.1-1 of TS 38.331. TS 38.331, Section 5.5.6.1 provides:

> The purpose of this procedure is to indicate to the network that the UE is going to start/stop location related measurements towards E-UTRA or NR (eutra-RSTD, nr-RSTD, nr-UE-RxTxTimeDiff, nr-PRS-RSRP) which require measurement gaps or start/stop detection of subframe and slot timing towards E-UTRA (eutra-Fine TimingDetection) which requires measurement gaps. UE shall initiate this procedure only after successful AS security activation.
>
> NOTE: It is a network decision to configure the measurement gap.

Regarding whether the UE needs to inform the NW about PRS measurement, there are several possible scenarios as discussed below (e.g., regardless of a concurrent gap).

- Case 1: If there is not any measurement gap configured to UE before UE was requested to provided PRS measurements by LMF, UE shall send "LocationMeasurementIndication" IE to require the measurement gap (either legacy gap or pre-MG with activation).
- Case 2: If there is a legacy measurement gap configured to UE (e.g. legMG1) before UE was requested to provided PRS measurements by LMF, UE need NOT forward "LocationMeasurementIndication" IE to require the measurement gap. That is, the UE can perform the PRS measurement with the legacy measurement gap legMG1.

Case 3: If there is a preconfigured measurement gap configured to the UE which was activated (e.g. preMG1-ON) before the UE was requested to provided PRS measurements by LMF, UE need NOT forward "LocationMeasurementIndication" IE to require another legacy MG. That is, the UE can perform the PRS measurement with the preconfigured measurement gap preMG1-ON.

Case 4-1: If there is a preconfigured measurement gap (preMG2) configured to UE which was deactivated (e.g. preMG2-OFF) before UE was requested to provided PRS measurements by LMF, the UE may send "LocationMeasurementIndication" IE to require measurement gap. The network may configure another legacy MG (legMG2) to the UE, and the UE may use the legacy MG legMG2 to perform the PRS measurement.

Case 4-2: If there is a preconfigured measurement gap (preMG2) configured to UE which was deactivated (e.g. preMG2-OFF) before UE was requested to provided PRS measurements by LMF, the UE may send "LocationMeasurementIndication" IE to require measurement gap. The NW may reconfigure the preconfigured measurement gap preMG2 as activated (preMG2-OFF-ON) for the UE, and the UE may perform the PRS measurement with preMG2-OFF-ON.

Accordingly, in various embodiments herein, the UE may inform the network that UE is going to perform PRS with a configured Pre-MG only if UE has not informed NW before Pre-MG configuration. In embodiments, it may be up to the network to decide to activate/deactivate the current Pre-MG or configure another MG (e.g., legacy MG) to UE.

Some example changes to 3GPP standards in accordance with various embodiments are presented below. It will be apparent that these are merely examples to effectuate the embodiments herein, and different changes to the standard may be made in accordance with various embodiments herein.

TS 38.133

Some example changes to TS 38.133, Section 9.1.2A.3 are shown below (additions in underline).

9.1.2A.3 Requirements

Any of the measurement gap pattern defined in Table 9.1.2-1 can be configured as Pre-MG pattern.

The UE capable of autonomous activation/deactivation mechanism [1] can autonomously change the Pre-MG status from activation to deactivation or vice versa based on any of the following triggering conditions:

DCI or timer based active BWP switching,

Activation/deactivation of SCell(s).

If per-UE Pre-MG pattern is activated then the UE is not required to conduct reception/transmission from/to the corresponding serving cells according to the same principles as described for per-UE measurement gaps in clause 9.1.2. Otherwise, the UE can be scheduled for reception/transmission of signals in all the serving cells.

If per-FR Pre-MG pattern is activated then the UE is not required to conduct reception/transmission from/to the corresponding serving cells on the same FR according to the same principles as described for per-FR measurement gaps in clause 9.1.2. Otherwise, the UE can be scheduled for reception/transmission of signals in all the serving cells in the same FR.

The UE shall autonomously assume the status of the per-UE Pre-MG pattern as deactivated immediately after the configuration of the per-UE Pre-MG pattern provided that all the configured measurements can be performed without measurement gaps. The UE shall autonomously assume the status of the per-FR Pre-MG pattern as deactivated immediately after the configuration of the per-FR Pre-MG pattern provided that all the configured measurements in the same FR can be performed without measurement gaps.

A measurement can be performed by the UE without measurement gaps if any of the following conditions is met:

The UE is configured with SSB based intra-frequency measurements, and the conditions defined for SSB based intra-frequency measurement without gaps in Clause 9.2.1 are met, or The UE is configured with SSB based inter-frequency measurements, and the conditions defined for SSB based inter-frequency measurement without gaps in Clause 9.3.1 are met, or The UE is configured with CSI-RS based intra-frequency measurements.

The UE shall autonomously assume the status of the per-UE Pre-MG pattern as activated immediately after the configuration of the per-UE Pre-MG pattern provided that at least one of the configured measurements cannot be performed without measurement gaps. The UE shall autonomously assume the status of the per-FR Pre-MG pattern as activated immediately after the configuration of the per-FR Pre-MG pattern provided that at least one of the configured measurements in the same FR cannot be performed without measurement gaps.

A measurement cannot be performed by the UE without measurement gaps if any of the following conditions is met:

The UE is configured with SSB based intra-frequency measurements, and the conditions defined for SSB based intra-frequency measurement without gaps in Clause 9.2.1 are not met, or The UE is configured with SSB based inter-frequency measurements, and the conditions defined for SSB based inter-frequency measurement without gaps in Clause 9.3.1 are not met, or The UE is configured with any of the following measurements:

CSI-RS based inter-frequency measurements, or

NR PRS-based positioning measurements, or

E-UTRA Inter-RAT measurements, or

E-UTRA Inter-RAT RSTD and E-CID measurements, or

UTRA Inter-RAT measurements.

When Pre-MG configured to UE for NR PRS measurement, UE shall inform the network about UE is going to perform PRS with the configured Pre-MG only if UE has not informed NW before Pre-MG configuration.

The UE capable of supporting Pre-MG pattern with network-controlled mechanism shall deactivate the Pre-MG pattern when any of the following conditions is met:

TS 38.331

Some example changes to TS 38.331, Section 5.5.6.1 are shown below (additions in underline).

5.5.6.1 General

The purpose of this procedure is to indicate to the network that the UE is going to start/stop location related measurements towards E-UTRA or NR (eutra-RSTD, nr-RSTD, nr-UE-RxTxTimeDiff, nr-PRS-RSRP) which require measurement gaps or start/stop detection of subframe and slot timing towards E-UTRA (eutra-FineTimingDetection) which requires measurement gaps. If UE was configured the pre-configured MG and not indicate this Pre-configured MG to NW before, UE shall inform the network about UE can perform PRS with the configured Pre-MG. And it is also up to the network decide to activate/deactivate the current Pre-MG or configure other legacy MG to UE. UE shall initiate this procedure only after successful AS security activation.

NOTE: It is a network decision to configure the measurement gap.

Systems and Implementations

Figure 2:
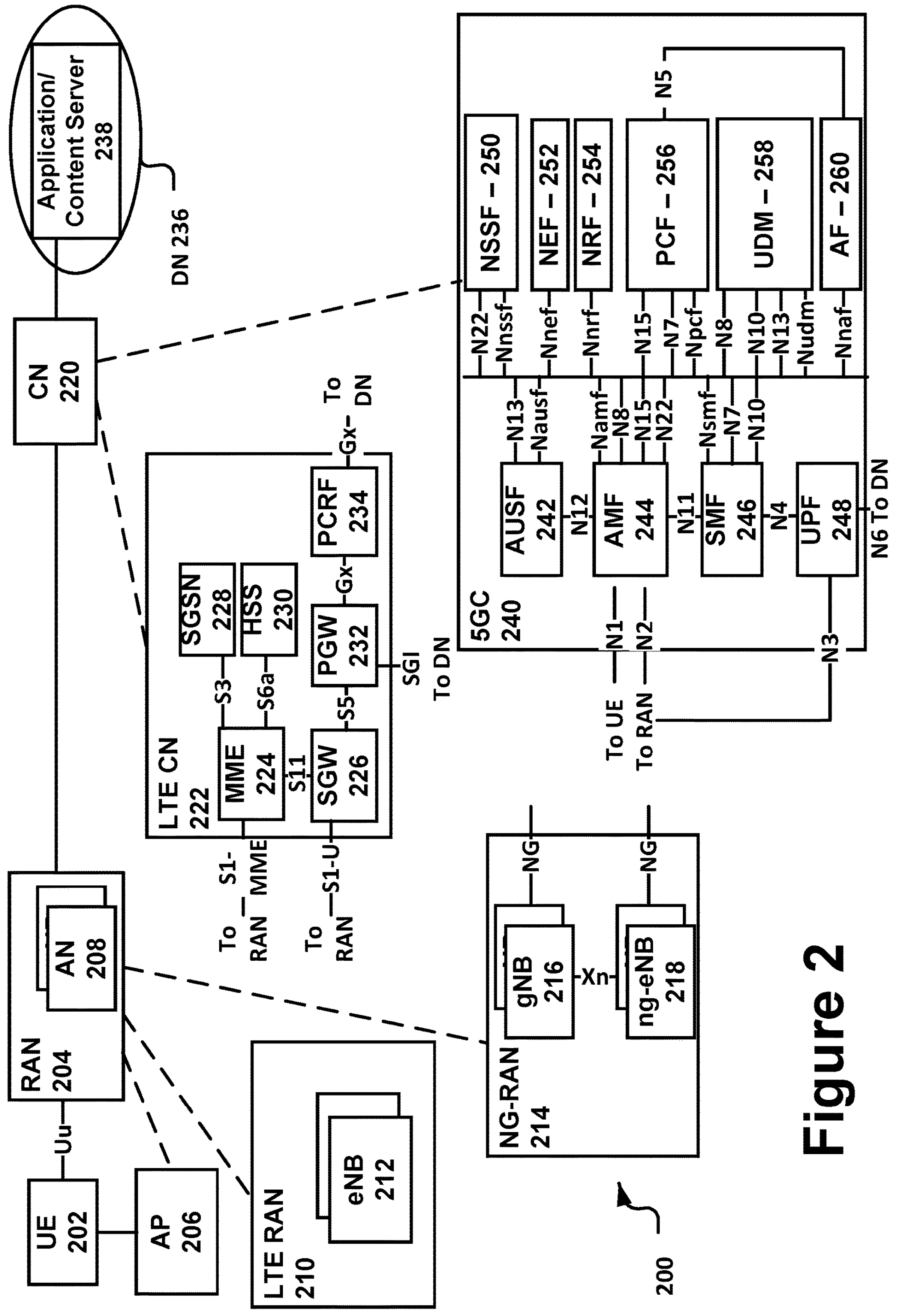
FIG. 2 schematically illustrates a wireless network in accordance with various embodiments.
Figure 3:
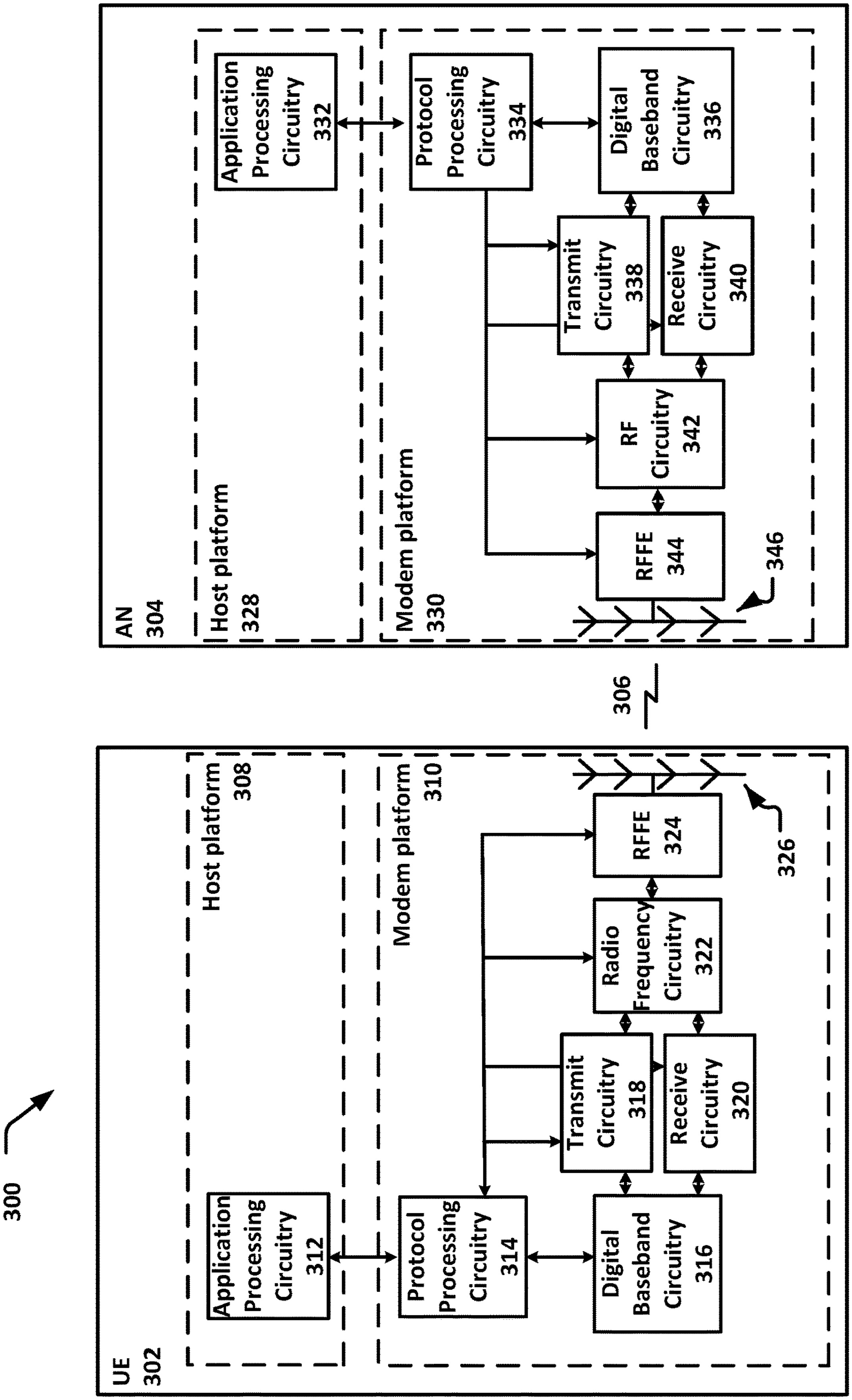
FIG. 3 schematically illustrates components of a wireless network in accordance with various embodiments.
Figure 4:
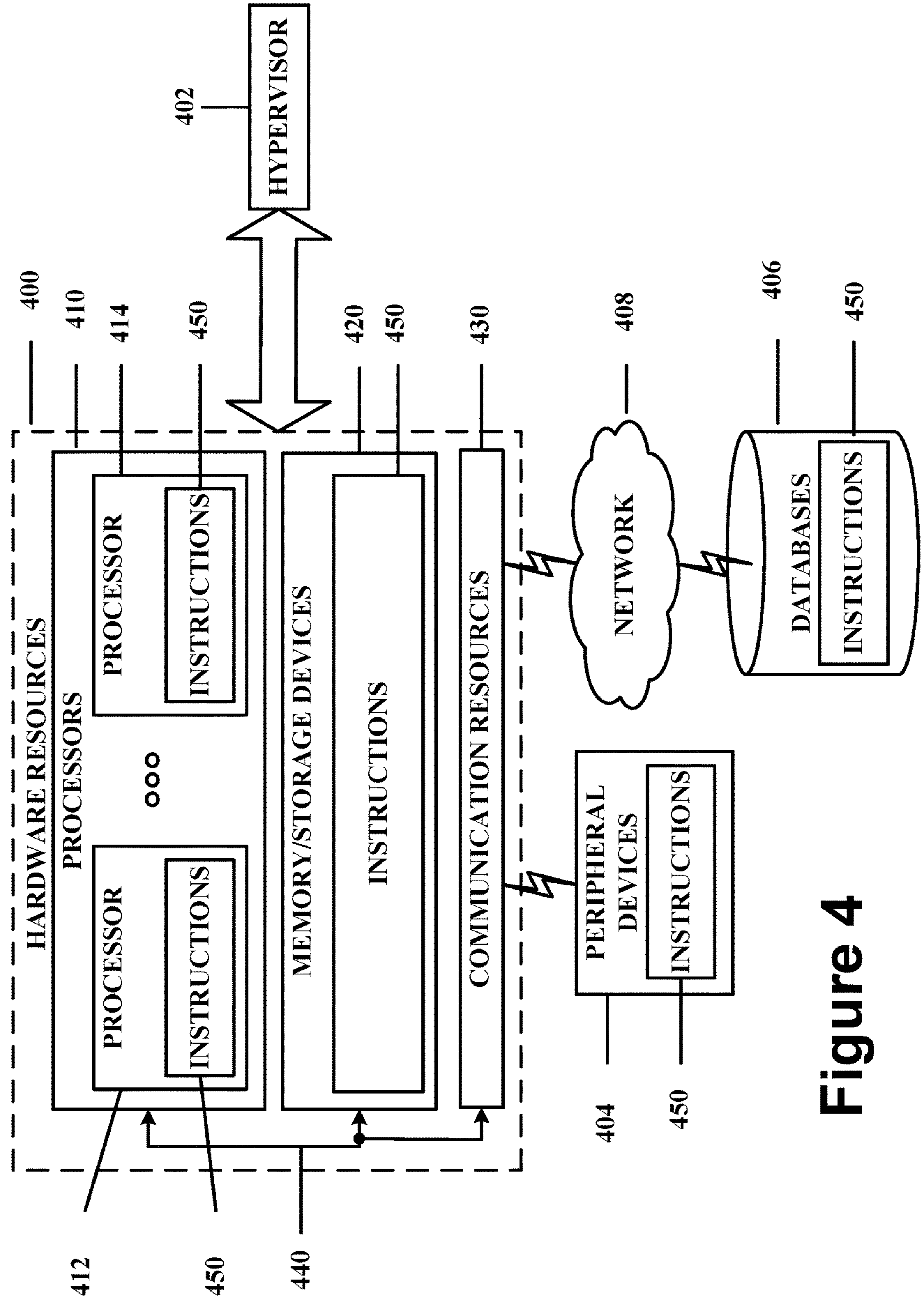
FIG. 4 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 2-4 illustrate various systems, devices, and components that may implement aspects of disclosed embodiments.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be communicatively coupled with the RAN 204 by a Uu interface. The UE 202 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, AN 208. AN 208 may terminate air-interface protocols for the UE 202 by providing access stratum protocols including RRC, PDCP, RLC, MAC, and L1 protocols. In this manner, the AN 208 may enable data/voice connectivity between CN 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low power base station for providing femtocells, picocells or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 202 or AN 208 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface, but may connect with a UE via an LTE air interface. The gNB 216 and the ng-eNB 218 may connect with each other over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amount of frequency resources (for example, PRBs) to support data transmission under different traffic loading scenarios. A BWP containing a smaller number of PRBs can be used for data transmission with small traffic load while allowing power saving at the UE 202 and in some cases at the gNB 216. A BWP containing a larger number of PRBs can be used for scenarios with higher traffic load.

The RAN 204 is communicatively coupled to CN 220 that includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be an LTE CN 222, which may also be referred to as an EPC. The LTE CN 222 may include MME 224, SGW 226, SGSN 228, HSS 230, PGW 232, and PCRF 234 coupled with one another over interfaces (or "reference points") as shown. Functions of the elements of the LTE CN 222 may be briefly introduced as follows.

The MME 224 may implement mobility management functions to track a current location of the UE 202 to facilitate paging, bearer activation/deactivation, handovers, gateway selection, authentication, etc.

The SGW 226 may terminate an S1 interface toward the RAN and route data packets between the RAN and the LTE CN 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track a location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 222 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 2 36 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 222. The PCRF 234 may be communicatively coupled to the app/content server 238 to determine appropriate QoS and charging parameters for service flows. The PCRF 232 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit an Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnect to data network 236, and a branching point to support multi-homed PDU session. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NSSAIs, if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on exposed capabilities of other NFs. This information may be stored at the NEF 252 as structured data, or at a data storage NF using standardized interfaces. The stored information can then be re-exposed by the NEF 252 to other NFs and AFs, or used for other purposes such as analytics. Additionally, the NEF 252 may exhibit an Nnef service-based interface.

The NRF 254 may support service discovery functions, receive NF discovery requests from NF instances, and provide the information of the discovered NF instances to the NF instances. NRF 254 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 254 may exhibit the Nnrf service-based interface.

The PCF 256 may provide policy rules to control plane functions to enforce them, and may also support unified policy framework to govern network behavior. The PCF 256 may also implement a front end to access subscription information relevant for policy decisions in a UDR of the UDM 258. In addition to communicating with functions over reference points as shown, the PCF 256 exhibit an Npcf service-based interface.

The UDM 258 may handle subscription-related information to support the network entities' handling of communication sessions, and may store subscription data of UE 202. For example, subscription data may be communicated via an N8 reference point between the UDM 258 and the AMF 244. The UDM 258 may include two parts, an application front end and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3$^{rd}$ party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit an Naf service-based interface.

The data network 236 may represent various network operator services, Internet access, or third party services that may be provided by one or more servers including, for example, application/content server 238.

FIG. 3 schematically illustrates a wireless network 300 in accordance with various embodiments. The wireless network 300 may include a UE 302 in wireless communication with an AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling, and can be consistent with cellular communications protocols such as an LTE protocol or a 5G NR protocol operating at mm Wave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more of layer operations to facilitate transmission or reception of data over the connection 306. The layer operations implemented by the protocol processing circuitry 314 may include, for example, MAC, RLC, PDCP, RRC and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 304 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 308 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include main memory, disk storage, or any suitable combination thereof. The memory/storage devices 420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

Example Procedures

In some embodiments, the electronic device(s), network(s), system(s), chip(s) or component(s), or portions or implementations thereof, of FIGS. 2-4, or some other figure herein, may be configured to perform one or more processes, techniques, or methods as described herein, or portions thereof. One such process 500 is depicted in FIG. 5. The process 500 may be performed by a UE or a portion thereof. At 502, the process 500 may include receiving a configuration of a pre-configured measurement gap. At 504, the process 500 may further include identifying that a measurement gap is needed for a positioning reference signal (PRS) measurement and that the UE has not previously notified a network of the PRS measurement prior to receipt of the configuration. At 506, the process 500 may further include encoding, based on the identification, a location measurement indication for transmission to a network entity to indicate that the PRS measurement is to be performed. In some embodiments, the network entity may be a gNB.

In some embodiments, the UE may use the pre-configured measurement gap for the PRS measurement. Additionally, or alternatively, the UE may receive a message from the gNB to activate or deactivate the pre-configured measurement gap for the PRS measurement, or configure another measurement gap (e.g., a legacy measurement gap) for the PRS measurement.

Figure 6:
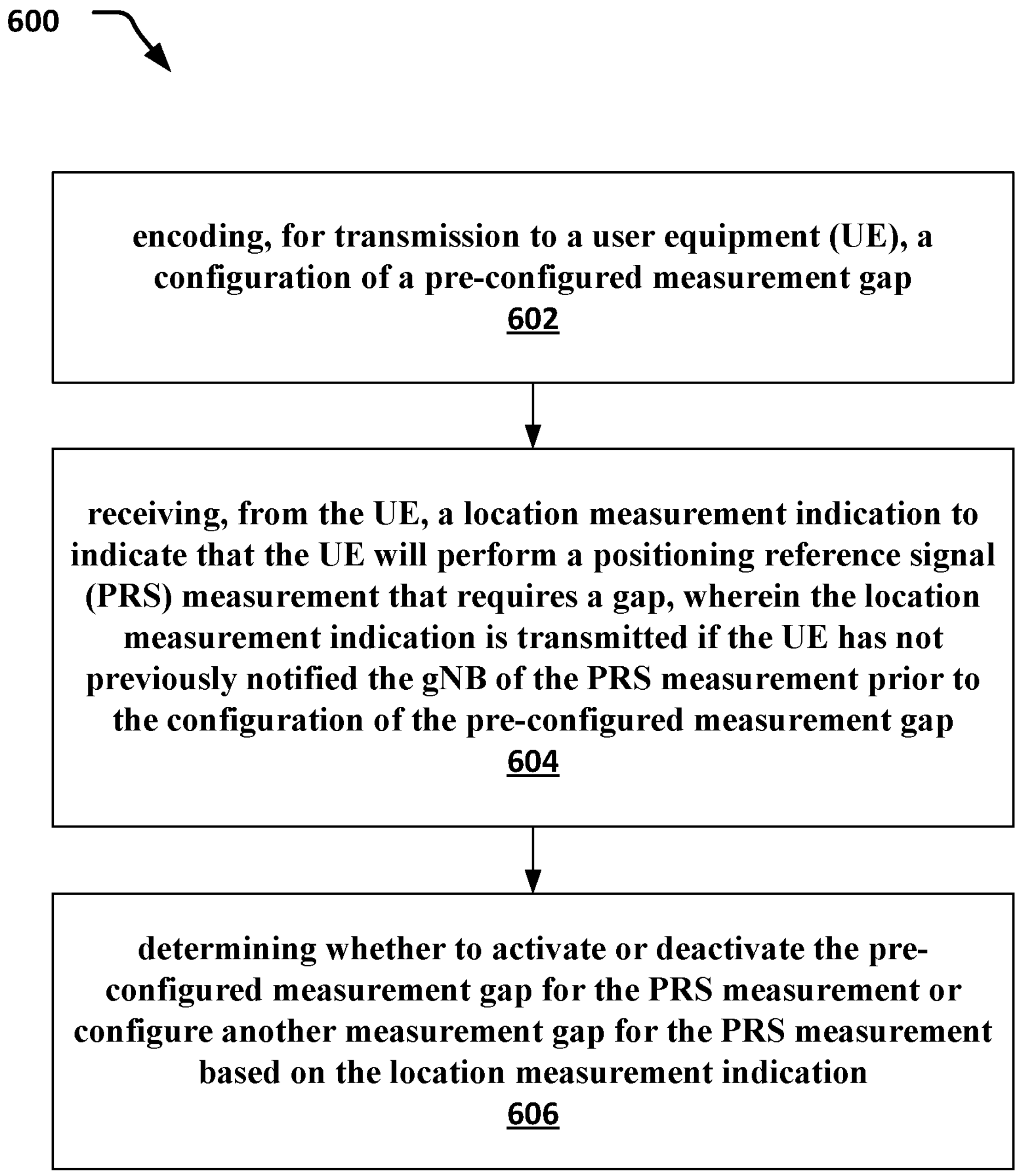
FIG. 6 illustrates another example process to practice the various embodiments herein.

FIG. 6 illustrates another example process 600 in accordance with various embodiments. The process 600 may be performed by a gNB or a portion thereof. At 602, the process 600 may include encoding, for transmission to a user equipment (UE), a configuration of a pre-configured measurement gap. At 604, the process 600 may further include receiving, from the UE, a location measurement indication to indicate that the UE will perform a positioning reference signal (PRS) measurement that requires a gap, wherein the location measurement indication is transmitted if the UE has not previously notified the gNB of the PRS measurement prior to the configuration of the pre-configured measurement gap. At 606, the process 600 may further include determining whether to activate or deactivate the pre-configured measurement gap for the PRS measurement or configure another measurement gap for the PRS measurement based on the location measurement indication.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include one or more non-transitory computer-readable media (NTCRM) having instructions, stored thereon, that when executed by one or more processors of a user equipment (UE) configure the UE to: receive a configuration of a pre-configured measurement gap; identify that a measurement gap is needed for a positioning reference signal (PRS) measurement and that the UE has not previously notified a network of the PRS measurement prior to receipt of the configuration; and encode, based on the identification, a location measurement indication for transmission to a network entity to indicate that the PRS measurement is to be performed.

Example 2 may include the one or more NTCRM of example 1 or some other example herein, wherein the instructions, when executed, are further to configure the UE to perform the PRS measurement using the pre-configured measurement gap.

Example 3 may include the one or more NTCRM of example 1 or some other example herein, wherein the instructions, when executed, are further to configure the UE to receive, after the transmission of the location measurement indication, a message to activate or deactivate the pre-configured measurement gap for the PRS measurement.

Example 4 may include the one or more NTCRM of example 1 or some other example herein, wherein the instructions, when executed, are further to configure the UE to receive, after the transmission of the location measurement indication, a message to configure a legacy measurement gap for the PRS measurement.

Example 5 may include the one or more NTCRM of example 1 or some other example herein, wherein the pre-configured measurement gap is in a deactivated state when the location measurement indication is encoded for transmission.

Example 6 may include the one or more NTCRM of example 1 or some other example herein, wherein the instructions, when executed, are further to configure the UE to receive a request from a location management function (LMF) to perform the PRS measurement.

Example 7 may include the one or more NTCRM of any of examples 1-6 or some other example herein, wherein the network entity is a next generation Node B (gNB).

Example 8 may include one or more non-transitory computer-readable media (NTCRM) having instructions, stored thereon, that when executed by one or more processors of a next generation Node B (gNB) configure the gNB to: encode, for transmission to a user equipment (UE), a configuration of a pre-configured measurement gap; receive, from the UE, a location measurement indication to indicate that the UE will perform a positioning reference signal (PRS) measurement that requires a gap, wherein the location measurement indication is transmitted if the UE has not previously notified the gNB of the PRS measurement prior to the configuration of the pre-configured measurement gap; and determine whether to activate or deactivate the pre-configured measurement gap for the PRS measurement or configure another measurement gap for the PRS measurement based on the location measurement indication.

Example 9 may include the one or more NTCRM of example 8 or some other example herein, wherein the instructions, when executed, are further to configure the gNB to encode, for transmission to the UE, a message to activate or deactivate the pre-configured measurement gap for the PRS measurement.

Example 10 may include the one or more NTCRM of example 8 or some other example herein, wherein the instructions, when executed, are further to configure the gNB to encode, after the transmission of the location measurement indication, a message to configure the another measurement gap for the PRS measurement.

Example 11 may include the one or more NTCRM of example 10 or some other example herein, wherein the another measurement gap is a legacy measurement gap.

Example 12 may include the one or more NTCRM of any one of examples 8-11 or some other example herein, wherein the pre-configured measurement gap is in a deactivated state when the location measurement indication is received.

Example 13 may include an apparatus to be implemented in a user equipment (UE), the apparatus comprising: a memory to store a configuration for a pre-configured measurement gap; and processor circuitry coupled to the memory. The processor circuitry is to: receive, from a location management function (LMF), a request for a positioning measurement; identify that the UE has not previously notified a network of the positioning measurement prior to receipt of the configuration of the pre-configured measurement gap; and encode, based on the identification, an indication for transmission to a next generation Node B (gNB) to indicate that the positioning measurement is to be performed and a measurement gap is needed for the positioning measurement.

Example 14 may include the apparatus of example 13 or some other example herein, wherein the processor circuity is further to obtain the positioning measurement using the pre-configured measurement gap.

Example 15 may include the apparatus of example 13 or some other example herein, wherein the processor circuitry is to receive, after the transmission of the indication that the positioning measurement is to be performed, a message from the gNB to activate or deactivate the pre-configured measurement gap for the positioning measurement.

Example 16 may include the apparatus of example 13 or some other example herein, wherein the processor circuitry is to receive, after the transmission of the indication that the positioning measurement is to be performed, a message from the gNB to configure another measurement gap for the positioning measurement.

Example 17 may include the apparatus of example 13 or some other example herein, wherein the indication that the positioning measurement is to be performed is encoded for transmission based further on the pre-configured measurement gap being in a deactivated state.

Example 18 may include the apparatus of any one of examples 13-17 or some other example herein, wherein the positioning measurement is a positioning reference signal measurement.

Example Z01 may include an apparatus comprising means to perform one or more elements of a method described in or related to any of examples 1-18, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-18, or any other method or process described herein.

Example Z03 may include an apparatus comprising logic, modules, or circuitry to perform one or more elements of a method described in or related to any of examples 1-18, or any other method or process described herein.

Example Z04 may include a method, technique, or process as described in or related to any of examples 1-18, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-18, or portions thereof.

Example Z06 may include a signal as described in or related to any of examples 1-18, or portions or parts thereof.

Example Z07 may include a datagram, packet, frame, segment, protocol data unit (PDU), or message as described in or related to any of examples 1-18, or portions or parts thereof, or otherwise described in the present disclosure.

Example Z08 may include a signal encoded with data as described in or related to any of examples 1-18, or portions or parts thereof, or otherwise described in the present disclosure.

Example Z09 may include a signal encoded with a datagram, packet, frame, segment, protocol data unit (PDU), or message as described in or related to any of examples 1-18, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-18, or portions thereof.

Example Z11 may include a computer program comprising instructions, wherein execution of the program by a processing element is to cause the processing element to carry out the method, techniques, or process as described in or related to any of examples 1-18, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

3GPP Third Generation Partnership Project
4G Fourth Generation
5G Fifth Generation
5GC 5G Core network
AC Application Client
ACR Application Context Relocation
ACK Acknowledgement
ACID Application Client Identification
AF Application Function
AM Acknowledged Mode
AMBRAggregate Maximum Bit Rate
AMF Access and Mobility Management Function
AN Access Network
ANR Automatic Neighbour Relation
AOA Angle of Arrival
AP Application Protocol, Antenna Port, Access Point
API Application Programming Interface
APN Access Point Name
ARP Allocation and Retention Priority
ARQ Automatic Repeat Request
AS Access Stratum
ASP Application Service Provider
ASN.1 Abstract Syntax Notation One
AUSF Authentication Server Function
AWGN Additive White Gaussian Noise
BAP Backhaul Adaptation Protocol
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CDR Charging Data Request
CDR Charging Data Response
CFRA Contention Free Random Access
CG Cell Group
CGF Charging Gateway Function
CHF Charging Function
CI Cell Identity
CID Cell-ID (e.g., positioning method)
CIM Common Information Model
CIR Carrier to Interference Ratio
CK Cipher Key
CM Connection Management, Conditional Mandatory -continued CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICHCommon Pilot Channel
CQI Channel Quality Indicator
CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSCF call session control function
CSAR Cloud Service Archive
CSI Channel-State Information
CSI-IM CSI Interference Measurement
CSI-RS CSI Reference Signal
CSI-RSRP CSI reference signal received power
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell-specific Search Space
CTF Charging Trigger Function
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit
DM-RS, DMRS Demodulation Reference Signal
DN Data network
DNN Data Network Name
DNAI Data Network Access Identifier
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End
EAS Edge Application Server
ECCA extended clear channel assessment, extended CCA
ECCE Enhanced Control Channel Element, Enhanced CCE
ED Energy Detection
EDGE Enhanced Datarates for GSM Evolution (GSM Evolution)
EAS Edge Application Server
EASID Edge Application Server Identification
ECS Edge Configuration Server
ECSP Edge Computing Service Provider
EDN Edge Data Network
EEC Edge Enabler Client
EECID Edge Enabler Client Identification
EES Edge Enabler Server
EESID Edge Enabler Server Identification
EHE Edge Hosting Environment
EGMF Exposure Governance Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity EPC Evolved Packet Core
EPDCCH enhanced PDCCH, enhanced Physical Downlink Control Cannel
EPRE Energy per resource element
EPS Evolved Packet System
EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control CHannel
FACCH/F Fast Associated Control Channel/Full rate
FACCH/H Fast Associated Control Channel/Half rate
FACH Forward Access Channel
FAUSCH Fast Uplink Signalling Channel
FB Functional Block
FBI Feedback Information
FCC Federal Communications Commission
FCCH Frequency Correction CHannel
FDD Frequency Division Duplex
FDM Frequency Division Multiplex
FDMAFrequency Division Multiple Access
FE Front End
FEC Forward Error Correction
FFS For Further Study
FFT Fast Fourier Transformation
feLAA further enhanced Licensed Assisted Access, further enhanced LAA
FN Frame Number
FPGA Field-Programmable Gate Array
FR Frequency Range
FQDN Fully Qualified Domain Name
G-RNTI GERAN Radio Network Temporary Identity
GERAN GSM EDGE RAN, GSM EDGE Radio Access Network
GGSN Gateway GPRS Support Node
GLONASS GLObal'naya NAvigatsionnaya Sputnikovaya Sistema (Engl.: Global Navigation Satellite System)
gNB Next Generation NodeB
gNB-CU gNB-centralized unit, Next Generation NodeB centralized unit
gNB-DU gNB-distributed unit, Next Generation NodeB distributed unit
GNSS Global Navigation Satellite System
GPRS General Packet Radio Service
GPSI Generic Public Subscription Identifier
GSM Global System for Mobile Communications, Groupe Spécial Mobile
GTP GPRS Tunneling Protocol
GTP-UGPRS Tunnelling Protocol for User Plane
GTS Go To Sleep Signal (related to WUS)
GUMMEI Globally Unique MME Identifier
GUTI Globally Unique Temporary UE Identity
HARQ Hybrid ARQ, Hybrid Automatic Repeat Request
HANDO Handover
HFN HyperFrame Number
HHO Hard Handover
HLR Home Location Register
HN Home Network
HO Handover
HPLMN Home Public Land Mobile Network
HSDPA High Speed Downlink Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Protocol Secure (https is http/1.1 over SSL, i.e. port 443)
I-Block Information Block
ICCID Integrated Circuit Card Identification
IAB Integrated Access and Backhaul
ICIC Inter-Cell Interference Coordination
ID Identity, identifier
IDFT Inverse Discrete Fourier Transform
IE Information element
IBE In-Band Emission
IEEE Institute of Electrical and Electronics Engineers
IEI Information Element Identifier
IEIDL Information Element Identifier Data Length IETF Internet Engineering Task Force
IF Infrastructure
IIOT Industrial Internet of Things
IM Interference Measurement, Intermodulation, IP Multimedia
IMC IMS Credentials
IMEI International Mobile Equipment Identity
IMGI International mobile group identity
IMPI IP Multimedia Private Identity
IMPU IP Multimedia PUblic identity
IMS IP Multimedia Subsystem
IMSI International Mobile Subscriber Identity
IoT Internet of Things
IP Internet Protocol
Ipsec IP Security, Internet Protocol Security
IP-CAN IP-Connectivity Access Network
IP-M IP Multicast
IPv4 Internet Protocol Version 4
IPv6 Internet Protocol Version 6
IR Infrared
IS In Sync
IRP Integration Reference Point
ISDN Integrated Services Digital Network
ISIM IM Services Identity Module
ISO International Organisation for Standardisation
ISP Internet Service Provider
IWF Interworking-Function
I-WLAN Interworking WLAN
Constraint length of the convolutional code, USIM Individual key
kB Kilobyte (1000 bytes)
kbps kilo-bits per second
Kc Ciphering key
Ki Individual subscriber authentication key
KPI Key Performance Indicator
KQI Key Quality Indicator
KSI Key Set Identifier
ksps kilo-symbols per second
KVM Kernel Virtual Machine
L1 Layer 1 (physical layer)
L1-RSRP Layer 1 reference signal received power
L2 Layer 2 (data link layer)
L3 Layer 3 (network layer)
LAA Licensed Assisted Access
LAN Local Area Network
LADN Local Area Data Network
LBT Listen Before Talk
LCM LifeCycle Management
LCR Low Chip Rate
LCS Location Services
LCID Logical Channel ID
LI Layer Indicator
LLC Logical Link Control, Low Layer Compatibility
LMF Location Management Function
LOS Line of Sight
LPLMN Local PLMN
LPP LTE Positioning Protocol
LSB Least Significant Bit
LTE Long Term Evolution
LWA LTE-WLAN aggregation
LWIP LTE/WLAN Radio Level Integration with IPsec Tunnel
LTE Long Term Evolution
M2M Machine-to-Machine
MAC Medium Access Control (protocol layering context)
MAC Message authentication code (security/encryption context)
MAC-A MAC used for authentication and key agreement (TSG T WG3 context)
MAC-IMAC used for data integrity of signalling messages (TSG T WG3 context)
MANO Management and Orchestration
MBMS Multimedia Broadcast and Multicast Service
MBSFN Multimedia Broadcast multicast service Single Frequency Network
MCC Mobile Country Code
MCG Master Cell Group
MCOTMaximum Channel Occupancy Time
MCS Modulation and coding scheme
MDAFManagement Data Analytics Function
MDASManagement Data Analytics Service
MDT Minimization of Drive Tests
ME Mobile Equipment -continued MeNB master eNB
MER Message Error Ratio
MGL Measurement Gap Length
MGRP Measurement Gap Repetition Period
MIB Master Information Block, Management Information Base
MIMO Multiple Input Multiple Output
MLC Mobile Location Centre
MM Mobility Management
MME Mobility Management Entity
MN Master Node
MNO Mobile Network Operator
MO Measurement Object, Mobile Originated
MPBCH MTC Physical Broadcast CHannel
MPDCCH MTC Physical Downlink Control CHannel
MPDSCH MTC Physical Downlink Shared CHannel
MPRACH MTC Physical Random Access CHannel
MPUSCH MTC Physical Uplink Shared Channel
MPLS MultiProtocol Label Switching
MS Mobile Station
MSB Most Significant Bit
MSC Mobile Switching Centre
MSI Minimum System Information,
MCH Scheduling Information
MSID Mobile Station Identifier
MSIN Mobile Station Identification Number
MSISDN Mobile Subscriber ISDN Number
MT Mobile Terminated, Mobile Termination
MTC Machine-Type Communications
mMTCmassive MTC, massive Machine-Type Communications
MU-MIMO Multi User MIMO
MWUS MTC wake-up signal, MTC WUS
NACK Negative Acknowledgement
NAI Network Access Identifier
NAS Non-Access Stratum, Non- Access Stratum layer
NCT Network Connectivity Topology
NC-JT Non-Coherent Joint Transmission
NEC Network Capability Exposure
NE-DC NR-E-UTRA Dual Connectivity
NEF Network Exposure Function
NF Network Function
NFP Network Forwarding Path
NFPD Network Forwarding Path Descriptor
NFV Network Functions Virtualization
NFVI NFV Infrastructure
NFVO NFV Orchestrator
NG Next Generation, Next Gen
NGEN-DC NG-RAN E-UTRA-NR Dual Connectivity
NM Network Manager
NMS Network Management System
N-PoP Network Point of Presence
NMIB, N-MIB Narrowband MIB
NPBCH Narrowband Physical Broadcast CHannel
NPDCCH Narrowband Physical Downlink Control CHannel
NPDSCH Narrowband Physical Downlink Shared CHannel
NPRACH Narrowband Physical Random Access CHannel
NPUSCH Narrowband Physical Uplink Shared CHannel
NPSS Narrowband Primary Synchronization Signal
NSSS Narrowband Secondary Synchronization Signal
NR New Radio, Neighbour Relation
NRF NF Repository Function
NRS Narrowband Reference Signal
NS Network Service
NSA Non-Standalone operation mode
NSD Network Service Descriptor
NSR Network Service Record
NSSAINetwork Slice Selection Assistance Information
S-NNSAI Single-NSSAI
NSSF Network Slice Selection Function
NW Network
NWUSNarrowband wake-up signal, Narrowband WUS
NZP Non-Zero Power
O&M Operation and Maintenance
ODU2 Optical channel Data Unit - type 2
OFDMOrthogonal Frequency Division Multiplexing
OFDMA Orthogonal Frequency Division Multiple Access
OOB Out-of-Band
OOS Out of Sync
OPEX OPerating EXpense
OSI Other System Information -continued OSS Operations Support System
OTA over-the-air
PAPR Peak-to-Average Power Ratio
PAR Peak to Average Ratio
PBCH Physical Broadcast Channel
PC Power Control, Personal Computer
PCC Primary Component Carrier, Primary CC
P-CSCF Proxy CSCF
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol,
Packet Data Convergence Protocol layer
PDCCH Physical Downlink Control Channel
PDCP Packet Data Convergence Protocol
PDN Packet Data Network, Public Data Network
PDSCH Physical Downlink Shared Channel
PDU Protocol Data Unit
PEI Permanent Equipment Identifiers
PFD Packet Flow Description
P-GW PDN Gateway
PHICH Physical hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network Function Descriptor
PNFR Physical Network Function Record
POC PTT over Cellular
PP, PTP Point-to-Point
PPP Point-to-Point Protocol
PRACH Physical RACH
PRB Physical resource block
PRG Physical resource block group
ProSe Proximity Services, Proximity-Based Service
PRS Positioning Reference Signal
PRR Packet Reception Radio
PS Packet Services
PSBCH Physical Sidelink Broadcast Channel
PSDCH Physical Sidelink Downlink Channel
PSCCH Physical Sidelink Control Channel
PSSCH Physical Sidelink Shared Channel
PSCell Primary SCell
PSS Primary Synchronization Signal
PSTN Public Switched Telephone Network
PT-RS Phase-tracking reference signal
PTT Push-to-Talk
PUCCH Physical Uplink Control Channel
PUSCH Physical Uplink Shared Channel
QAM Quadrature Amplitude Modulation
QCI QoS class of identifier
QCL Quasi co-location
QFI QoS Flow ID, QoS Flow Identifier
QoS Quality of Service
QPSK Quadrature (Quarternary) Phase Shift Keying
QZSS Quasi-Zenith Satellite System
RA-RNTI Random Access RNTI
RAB Radio Access Bearer, Random Access Burst
RACH Random Access Channel
RADIUS Remote Authentication Dial In User Service
RAN Radio Access Network
RAND RANDom number (used for authentication)
RAR Random Access Response
RAT Radio Access Technology
RAU Routing Area Update
RB Resource block, Radio Bearer
RBG Resource block group
REG Resource Element Group
Rel Release
REQ REQuest
RF Radio Frequency
RI Rank Indicator
RIV Resource indicator value
RL Radio Link
RLC Radio Link Control, Radio Link Control layer -continued RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining Minimum System Information
RN Relay Node
RNC Radio Network Controller
RNL Radio Network Layer
RNTI Radio Network Temporary Identifier
ROHC RObust Header Compression
RRC Radio Resource Control, Radio Resource Control layer
RRM Radio Resource Management
RS Reference Signal
RSRP Reference Signal Received Power
RSRQ Reference Signal Received Quality
RSSI Received Signal Strength Indicator
RSU Road Side Unit
RSTD Reference Signal Time difference
RTP Real Time Protocol
RTS Ready-To-Send
RTT Round Trip Time
Rx Reception, Receiving, Receiver
S1AP S1 Application Protocol
S1-MME S1 for the control plane
S1-U S1 for the user plane
S-CSCF serving CSCF
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC
SCell Secondary Cell
SCEF Service Capability Exposure Function
SC-FDMA Single Carrier Frequency Division Multiple Access
SCG Secondary Cell Group
SCM Security Context Management
SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Session Description Protocol
SDSF Structured Data Storage Function
SDT Small Data Transmission
SDU Service Data Unit
SEAF Security Anchor Function
SeNB secondary eNB
SEPP Security Edge Protection Proxy
SFI Slot format indication
SFTD Space-Frequency Time Diversity, SFN and frame timing difference
SFN System Frame Number
SgNB secondary gNB
SGSN Serving GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement Timing Configuration
SN Secondary Node, Sequence Number
SoC System on Chip
SON Self-Organizing Network
SpCell Special Cell -continued SP-CSI-RNTI Semi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block
SSID Service Set Identifier
SS/PBCH Block SSBRI SS/PBCH Block Resource Indicator, Synchronization Signal Block Resource Indicator
SSC Session and Service Continuity
SS-RSRP Synchronization Signal based Reference Signal Received Power
SS-RSRQ Synchronization Signal based Reference Signal Received Quality
SS-SINR Synchronization Signal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink
TA Timing Advance, Tracking Area
TAC Tracking Area Code
TAG Timing Advance Group
TAI Tracking Area Identity
TAU Tracking Area Update
TB Transport Block
TBS Transport Block Size
TBD To Be Defined
TCI Transmission Configuration Indicator
TCP Transmission Communication Protocol
TDD Time Division Duplex
TDM Time Division Multiplexing
TDMA Time Division Multiple Access
TE Terminal Equipment
TEID Tunnel End Point Identifier
TFT Traffic Flow Template
TMSI Temporary Mobile Subscriber Identity
TNL Transport Network Layer
TPC Transmit Power Control
TPMI Transmitted Precoding Matrix Indicator
TR Technical Report
TRP, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous Receiver and Transmitter
UCI Uplink Control Information
UE User Equipment
UDM Unified Data Management
UDP User Datagram Protocol
USDF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Function
URI Uniform Resource Identifier
URL Uniform Resource Locator
URLLC Ultra-Reliable and Low Latency
USB Universal Serial Bus
USIM Universal Subscriber Identity Module
USS UE-Specific search space
UTRA UMTS Terrestrial Radio Access
UTRAN Universal Terrestrial Radio Access Network
UwPTS Uplink Pilot Time Slot
V1I Vehicle-to-Infrastruction
V2P Vehicle-to-Pedestrian
V2V Vehicle-to-Vehicle
V2X Vehicle-to-everything
VIM Virtualized Infrastructure Manager -continued

| | |
|---|---|
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user REsponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. A user equipment (UE) configured for operation in a fifth-generation new radio (5G NR) network, the UE comprising: processing circuitry; and memory, wherein the processing circuitry is configured to:

decode a configuration message from the network indicating that one or more measurement gaps are configured as preconfigured measurement gaps;

in response to receiving an indication to start performing location measurements, configure the UE to:

transmit a LocationMeasurementIndication message to the network to indicate that the UE will start location related measurements which require measurement gaps when the UE is not able to use any of the preconfigured measurement gaps, when activated, for the location measurements; and transmit a measurement gap activation request, without sending the LocationMeasurementIndication message, to request activation of at least one of the preconfigured measurement gaps when the at least one of the preconfigured measurement gaps is configured for positioning and is able to be used by the UE for the location measurements when activated.

2. The UE of claim 1, wherein the measurement gap activation request is a request that the network activate one of the preconfigured measurement gaps for the location measurements.

3. The UE of claim 2, wherein when the preconfigured measurement gaps are not configured for positioning, the processing circuitry is configured to transmit the LocationMeasurementIndication message to indicate that the UE will start location related measurements which require measurement gaps.

4. The UE of claim 2, wherein in response to receiving an indication to stop performing location measurements and when one of the preconfigured measurement gaps is activated for positioning, the processing circuitry is configured to deactivate all activated measurement gaps that are configured for positioning.

5. The UE of claim 2, wherein in response to receiving an indication to stop performing location measurements and when there is a configured measurement gap for positioning that is not one of the preconfigured measurement gaps that is activated for positioning, the processing circuitry is to configure the UE to transmit the LocationMeasurementIndication message to the network to indicate that the UE will stop location related measurements which require measurement gaps.

6. The UE of claim 2, wherein in response to transmission of the LocationMeasurementIndication message to indicate that the UE will start location related measurements which require a measurement gap, and when the UE receives a measurement gap configuration message that configures the UE with measurement gaps that are preconfigured measurement gaps, the processing circuitry configures the UE to perform the location measurements during the preconfigured measurement gaps.

7. The UE of claim 5, wherein in response to transmission of the LocationMeasurementIndication message to indicate that the UE will start location related measurements which require a measurement gap, and when the UE receives a measurement gap configuration message that configures the UE with measurement gaps that are not preconfigured measurement gaps, the processing circuitry configures the UE to perform the location measurements during the measurement gaps that are not preconfigured measurement gaps.

8. The UE of claim 1, wherein for measurement gaps that are configured as the preconfigured measurement gaps, the UE is configured to autonomously activate or deactivate the preconfigured measurement gaps in response to bandwidth part (BWP) switching.

9. The UE of claim 8, wherein for the measurement gaps that are not configured as the preconfigured measurement gaps, an activation or deactivation status of the measurement gaps is controlled by the network.

10. A non-transitory computer-readable storage medium that stores instructions for execution by processing circuitry of a user equipment (UE) configured for operation in a fifth-generation new radio (5G NR) network, wherein the processing circuitry is configured to:

decode a configuration message from the network indicating that one or more measurement gaps are configured as preconfigured measurement gaps;

in response to receiving an indication to start performing location measurements, configure the UE to:

transmit a LocationMeasurementIndication message to the network to indicate that the UE will start location related measurements which require measurement gaps when the preconfigured measurement gaps, when activated, are not usable for the location measurements; and transmit a measurement gap activation request, without sending the LocationMeasurementIndication message, to request activation of at least one of the preconfigured measurement gaps when the at least one of the preconfigured measurement gaps is configured for positioning and is able to be used by the UE for the location measurements when activated.

11. The non-transitory computer-readable storage medium of claim 10, wherein the measurement gap activation request is a request that the network activate one of the preconfigured measurement gaps for the location measurements.

12. The non-transitory computer-readable storage medium of claim 11, wherein when the preconfigured measurement gaps are not configured for positioning, the processing circuitry is configured to transmit the LocationMeasurementIndication message to indicate that the UE will start location related measurements which require measurement gaps.

13. The non-transitory computer-readable storage medium of claim 11, wherein in response to receiving an indication to stop performing location measurements and when one of the preconfigured measurement gaps is activated for positioning, the processing circuitry is configured to deactivate all activated measurement gaps that are configured for positioning.

14. The non-transitory computer-readable storage medium of claim 11, wherein in response to receiving an indication to stop performing location measurements and when there is a configured measurement gap for positioning that is not one of the preconfigured measurement gaps that is activated for positioning, the processing circuitry is to configure the UE to transmit the LocationMeasurementIndication message to the network to indicate that the UE will stop location related measurements which require measurement gaps.

15. The non-transitory computer-readable storage medium of claim 11, wherein in response to transmission of the LocationMeasurementIndication message to indicate that the UE will start location related measurements which require a measurement gap, and when the UE receives a measurement gap configuration message that configures the UE with measurement gaps that are preconfigured measurement gaps, the processing circuitry configures the UE to perform the location measurements during the preconfigured measurement gaps.

16. The non-transitory computer-readable storage medium of claim 14, wherein in response to transmission of the LocationMeasurementIndication message to indicate that the UE will start location related measurements which require a measurement gap, and when the UE receives a measurement gap configuration message that configures the UE with measurement gaps that are not preconfigured measurement gaps, the processing circuitry configures the UE to perform the location measurements during the measurement gaps that are not preconfigured measurement gaps.

17. The non-transitory computer-readable storage medium of claim 10, wherein for measurement gaps that are configured as the preconfigured measurement gaps, the UE is configured to autonomously activate or deactivate the preconfigured measurement gaps in response to bandwidth part (BWP) switching.

18. The non-transitory computer-readable storage medium of claim 17, wherein for the measurement gaps that are not configured as the preconfigured measurement gaps, an activation or deactivation status of the measurement gaps is controlled by the network.

19. A apparatus for a generation Node B (gNB) configured for operation in a fifth-generation new radio (5G NR) network, the apparatus comprising: processing circuitry; and memory, wherein the processing circuitry is configured to:

encode a configuration message for transmission to a user equipment (UE) indicating that one or more measurement gaps are configured as preconfigured measurement gaps;

send an indication to the UE to start performing location measurements; and in response to the indication sent to the UE:

receive a LocationMeasurementIndication message from the UE to indicate that the UE will start location related measurements which require measurement gaps when the UE is not able to use any of the preconfigured measurement gaps, when activated, for the location measurements; and receive a measurement gap activation request from the UE, to request activation of at least one of the preconfigured measurement gaps when the at least one of the preconfigured measurement gaps is configured for positioning and is able to be used by the UE for the location measurements when activated.

20. The apparatus of claim 19, wherein the measurement gap activation request is a request that the network activate one of the preconfigured measurement gaps for the location measurements, and wherein when the preconfigured measurement gaps are not configured for positioning, the processing circuitry is configured to receive the LocationMeasurementIndication message from the UE to indicate that the UE will start location related measurements which require measurement gaps.

* * * * *